(12) United States Patent
McDonald et al.

(10) Patent No.: US 7,549,467 B2
(45) Date of Patent: Jun. 23, 2009

(54) WELLBORE MOTOR HAVING MAGNETIC GEAR DRIVE

(75) Inventors: William J. McDonald, Houston, TX (US); Timothy F. Price, Rockwall, TX (US); Gareth P. Hatch, East Dundee, IL (US)

(73) Assignee: Dexter Magnetic Technologies, Inc., Elk Grove Village, IL (US)

( * ) Notice: Subject to any disclaimer, the term of this patent is extended or adjusted under 35 U.S.C. 154(b) by 40 days.

(21) Appl. No.: 11/684,600

(22) Filed: Mar. 10, 2007

(65) Prior Publication Data

US 2007/0215343 A1 Sep. 20, 2007

Related U.S. Application Data

(63) Continuation-in-part of application No. 11/604,660, filed on Nov. 27, 2006, now Pat. No. 7,481,283.

(60) Provisional application No. 60/783,542, filed on Mar. 17, 2006.

(51) Int. Cl.
*E21B 4/04* (2006.01)
*E21B 43/00* (2006.01)

(52) U.S. Cl. ............ 166/66.4; 166/66.5; 166/105; 175/104; 175/106; 417/420

(58) Field of Classification Search ............ 166/66.5, 166/66.4, 105; 175/106, 104, 328, 73; 417/420
See application file for complete search history.

(56) References Cited

U.S. PATENT DOCUMENTS

| | | | | |
|---|---|---|---|---|
| 4,725,197 A * | 2/1988 | Russell et al. | ............... | 415/104 |
| 4,732,225 A * | 3/1988 | Jurgens et al. | ............... | 175/92 |
| 5,839,508 A * | 11/1998 | Tubel et al. | ............... | 166/65.1 |
| 6,257,355 B1 * | 7/2001 | Baker | ............... | 175/50 |
| 6,279,651 B1 * | 8/2001 | Schwendemann et al. | .. | 166/54.1 |
| 6,289,986 B1 * | 9/2001 | Wright et al. | ............... | 166/66.5 |
| 6,431,270 B1 * | 8/2002 | Angle | ............... | 166/66.5 |
| 6,554,074 B2 * | 4/2003 | Longbottom | ............... | 166/372 |
| 6,672,409 B1 * | 1/2004 | Dock et al. | ............... | 175/107 |
| 6,848,503 B2 * | 2/2005 | Schultz et al. | ............... | 166/66.5 |
| 6,863,124 B2 * | 3/2005 | Araux et al. | ............... | 166/66.4 |
| 2003/0132003 A1 * | 7/2003 | Arauz et al. | ............... | 166/370 |
| 2005/0039921 A1 * | 2/2005 | Schultz et al. | ............... | 166/313 |

* cited by examiner

*Primary Examiner*—Shane Bomar
(74) *Attorney, Agent, or Firm*—Richard A. Fagin (57) ABSTRACT

A wellbore motor includes a source of rotational motive power disposed in a wellbore, a magnetic gear member operatively coupled at an input thereof to the source; and a magnetic gear member output coupled rotationally to a rotary wellbore tool.

49 Claims, 8 Drawing Sheets

WELLBORE MOTOR HAVING MAGNETIC GEAR DRIVE

CROSS-REFERENCE TO RELATED APPLICATIONS

This is a continuation in part of Ser. No. 11/604,660 filed on Nov. 27, 2006 now U.S. Pat. No. 7,481,283. Priority is claimed from U.S. Provisional Application No. 60/783,542 filed on Mar. 17, 2006.

STATEMENT REGARDING FEDERALLY SPONSORED RESEARCH OR DEVELOPMENT

Not applicable.

BACKGROUND OF THE INVENTION

1. Field of the Invention

The invention relates generally to the field of rotary tools used in drilling and completion of wellbores in the Earth. More specifically, the invention relates to rotary tools that make use of geared couplings between a driven input shaft and a driving output shaft.

2. Background Art

Drilling and completion of wellbores in the Earth, such as are used in the production of petroleum from subsurface reservoirs, includes the use of a number of types of rotary tools. A particularly important one of such rotary tools is the so-called "rotary steerable directional drilling system" (RSS). RSS systems are used in association with a drill string suspended from a drilling rig. The drill string is typically formed from lengths of steel pipe threaded together end to end and suspended from the rig by suitable hoisting equipment. Pumps force fluid called "drilling mud" through the interior of the drill string and out the bottom of the drill string through a drill bit, which performs the actual cutting of the rock formations. The exiting drilling mud cools the bit and lifts cuttings from the wellbore to the surface. The RSS system includes various steering or biasing devices thereon that selectively apply force normal to the axis of the drill string along a direction that the system operator intends to orient ("steer") the trajectory of the wellbore. An advantage of RSS systems is that they enable continuous rotation of the drill string to turn the drill bit during drilling operations. Such continuous drill string rotation can provide increased drill rates as contrasted with other directional drilling devices, such as steerable motors, that require stopping drill string rotation to orient the device thus to steer the trajectory of the wellbore. A limitation to RSS systems known in the art is that increased rotational speed of the drill string can reduce the operating life and in-wellbore reliability of such systems. It is desirable, particularly with certain types of drill bits, to rotate the drill string at relatively high rates, thus making the use of such bits with RSS systems impractical.

Another application for using rotary motive power in a wellbore is submersible pumps. Submersible pumps are used to lift fluids from the wellbore to the Earth's surface when pressure in a subsurface reservoir is insufficient to move the fluids out of the wellbore unassisted. Electric submersible pumps include electrical wiring connected from an electric current source at the Earth's surface to an electric motor disposed in the wellbore and rotationally coupled to a pump, such as a positive displacement or centrifugal pump. One unavoidable aspect of using an electric motor in a wellbore to drive a pump is that it is necessary to seal the motor against intrusion of fluid from the wellbore. Such sealing requires sealing against the rotating motor shaft. The requirement to seal against the rotating shaft has made it impractical to use high speed motors in wellbores because high rotational speeds tend to limit seal life.

The above limitations could be addressed by using forms of reduction gear systems. Reduction gear systems when operated in wellbore have a number of limitations. First, it is necessary to provide a rotary seal somewhere in the system. The interior of as least part of the system is usually filled with a lubricant, such as oil, that is subject to degradation when exposed to high temperatures (typical in wells drilled into the Earth). The fluid in the interior of the system must ordinarily be pressure compensated to be maintained at the same fluid pressure as the hydrostatic fluid pressure in the wellbore, or the rotary seal will be subjected to differential fluid pressure in excess of its capacity to exclude wellbore fluid from the interior of the device. Pressure compensation devices known in the art may be subject to delays in compensation, causing fluid penetration into the interior of the device or fluid leakage. To limit fluid intrusion caused by such delay, preferably, the pressure compensation device maintains a slightly higher fluid pressure inside the device than in the wellbore. The slight pressure differential has the effect of causing slow, but constant loss of the pressure compensating fluid. Thus, even under ideal conditions the typical rotating seal device has a finite time that it can be used in a wellbore before removal to replenish the compensating fluid.

In the case of rotary devices using gears to multiply or reduce output speed relative to input speed, loss of lubrication can lead to gear failure. Application of abrupt high torque has also been known to cause gear failure. While the strength of the gears could otherwise be increased by increasing the size of the gears, such remedy is limited in the case of wellbore tools because such tools are typically limited in diameter to that of the wellbore being drilled less an annular space to allow cuttings and return mud flow to the Earth's surface. In wellbore drilling generally, such abrupt torque application is frequent, because of the highly variable mechanical properties of the Earth formations being drilled and the relatively low resolution control over the amount of axial force applied to the drill bit on the typical drilling rig.

Typical reduction gear devices used in wellbore tools include planetary gear sets. Planetary gears are particularly suitable for wellbore applications because in wellbore applications the input and output shafts of the gear devices are typically coaxial. Planetary gears are generally limited to about 3¼ to 3½ to 1 input to output ratio because of the limitations of shaft and gear diameters, among other factors. To step up or step down the speed between input and output shafts more than would be feasible with a single planetary gear set would require coupling a plurality of such gear sets end to end. Such arrangement increases the overall length, weight, complexity and required lubrication reservoir capacity of the gear set.

There exists a need to have a wellbore rotary device that can include a gear unit that does not require rotary seals or pressure compensation. There also exists a need for a rotary device for use in a wellbore that can have a relatively wide range of gear reduction ratios without the need for compound gear sets.

SUMMARY OF THE INVENTION

One aspect of the invention is a wellbore motor includes a source of rotational motive power disposed in a wellbore, a magnetic gear member operatively coupled at an input thereof to the source; and a magnetic gear member output coupled rotationally to a rotary wellbore tool.

A magnetically geared wellbore motor according to another aspect of the invention includes a drill string extended into a wellbore and coupled to a drilling rig at the Earth's surface. An input shaft of the motor is rotationally coupled to the drill string in the wellbore. The input shaft has at least one magnet thereon. An output shaft of the motor is disposed rotatably about an exterior surface of the input shaft. The output shaft has thereon a plurality of circumferentially spaced apart pole pieces formed from ferromagnetic material. A magnet section having a plurality of magnets is disposed circumferentially about an exterior of the output shaft. The magnet section has a magnet retainer with an external shape adapted to cooperate with an interior of a housing in which the magnet section is disposed such that rotation between the magnet section and the housing is substantially prevented. The motor includes a driving device rotationally coupled to the output shaft and configured to drive a drill bit.

Another aspect of the invention is a wellbore pump. A pump according to this aspect of the invention includes a motor disposed in the wellbore. The motor is supplied by power from a source external to the wellbore. The pump includes a magnetic gear member rotationally coupled at an input thereof to an output of the motor, and a pump coupled at its input to an output of the magnetic gear member.

Other aspects and advantages of the invention will be apparent from the following description and the appended claims.

DETAILED DESCRIPTION

Figure 1:
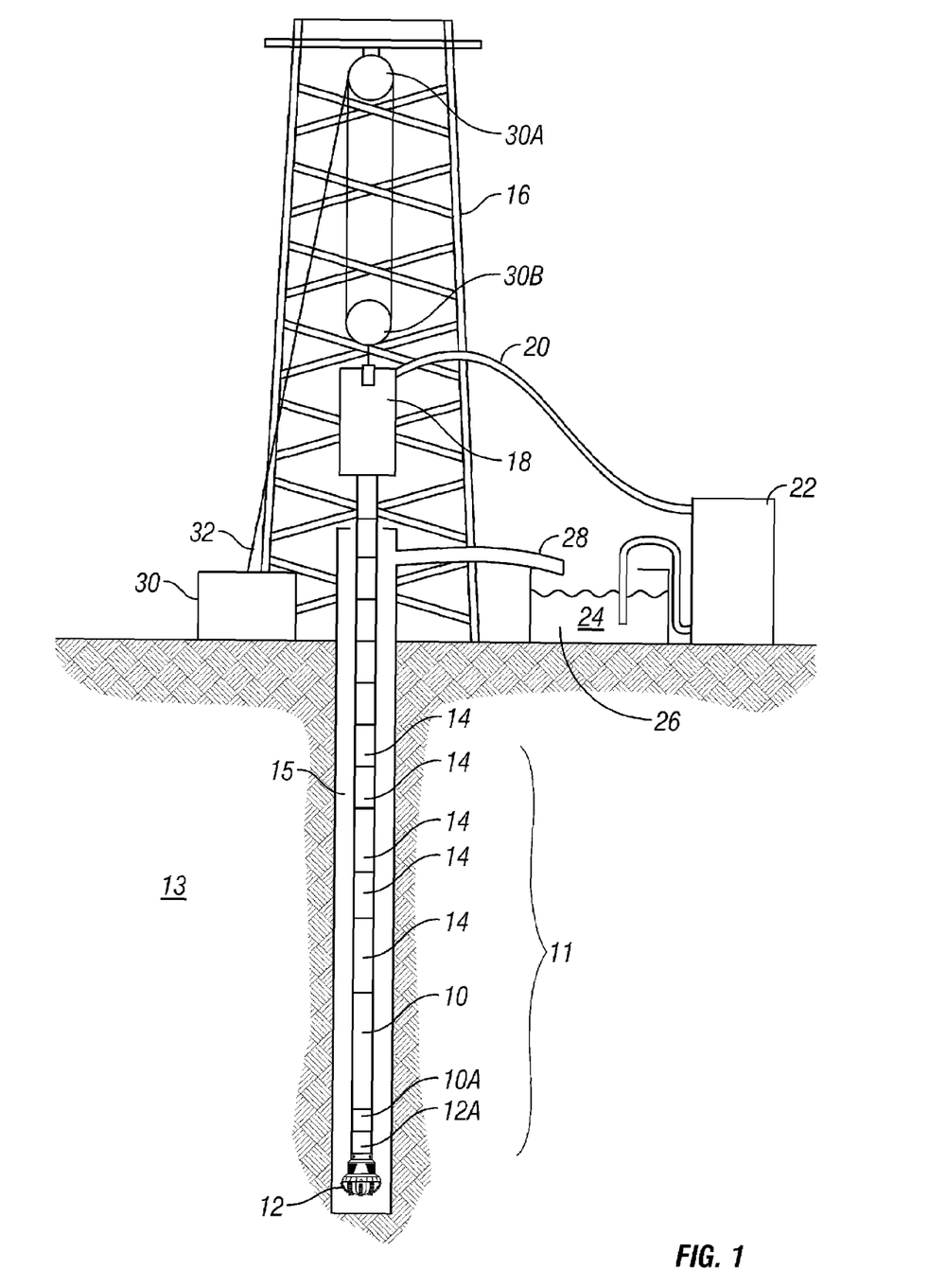
FIG. 1 shows a drilling rig moving a drill string in a wellbore to drill a wellbore through Earth formations.

An aspect of the invention related to geared wellbore motors will first be explained in terms of a drilling motor that uses flow of drilling mud as an energy source. One implementation of a wellbore fluid-driven, geared motor according to the invention is shown in FIG. 1 as it would be used in a drill string for drilling a wellbore into the Earth. The drill string 11 includes segments of drill pipe 14 threadedly coupled end to end and suspended at the upper end thereof by a top drive 18. The top drive 18 is movably suspended within a derrick structure of a drilling rig 16. The drilling rig 16 includes a drill line 32 spooled by a winch called a "drawworks" 30 to raise and lower the top drive 18 as required during drilling operations. The drill line 32 moves through a crown block 30A and a traveling block 30B having multiple sheaves thereon to raise and lower the top drive 18. The top drive 18 includes an electric or hydraulic motor (not shown separately) to turn the drill string 11 as needed during drilling operations. The foregoing illustration of a drilling rig and its associated equipment is only to show a possible application of a geared motor according to the invention. Other devices for conveying the motor into a wellbore that may be used with the invention include coiled tubing, production tubing, casing or any other conveyance known in the art. Accordingly, the threaded drill pipe, drilling rig, top drive and associated equipment shown in FIG. 1 are not limits on the scope of the invention.

The lowermost end of the drill string 11 includes a rotary wellbore tool, in this case a drill bit 12. The drill bit 12 is rotated and advanced axially to gouge, cut and/or crush the Earth formations 13 to advance the drilling of the wellbore 15. The drill bit 12 performs its well drilling action by being rotated by either or both the top drive 18 (through the drill string 11) and a fluid driven, geared motor called a "drilling motor", shown generally at 10. The drilling motor 10 will be explained in more detail with reference to FIGS. 2 and 3. The drilling motor 10 in the present embodiment is threadedly coupled to the drill string 11 at its upper end, and includes a rotatable "bit box" 10A at its lower end for threaded coupling to the drill bit 12 using a male threaded connection called a "pin end", shown 12A. The bit box 10A is able to rotate relative to the remainder of the drilling motor 10, as will be further explained below.

During drilling operations, the drill bit 12 is rotated, and some of the weight of the drill string 11 is applied to the drill bit 12 by rotating the drawworks 30 to selectively release the drill line 32. Selective release of the drill line 32 causes the top drive 18 to move downwardly by gravity, such that a measured portion of the weight of the drill string 11 and top drive 18 are transferred to the drill bit 12. As the drill bit 12 is axially urged into contact with the bottom of the wellbore 15 by such weight, and is rotated by the top drive 18 and/or the drilling motor 10, a mud pump 22 lifts drilling fluid called "drilling mud" 24 from a storage tank 26 or surface pit and pumps the drilling mud 24 through a standpipe 20 in hydraulic communication with the top drive 18. The drilling mud 24 is then forced through a central opening (not shown separately in FIG. 1) within the drill string 11 until it passes through the drilling motor 10, and finally, through orifices (not shown) called "jets" in the bit 12 such that drill cuttings (not shown) are lifted from the bottom of the wellbore 15 and are returned to the Earth's surface. After the drill cuttings (not shown) are removed from the drilling mud 24, the drilling mud 24 is returned to the tank 26 by a return line 28.

The drilling motor 10 includes internal components, as will be explained below with reference to FIGS. 2 and 3, that convert some of the energy in the moving drilling mud 24 into rotational energy to rotate the drill bit 12.

Another embodiment of a drilling system that includes a rotary steerable directional drilling system at the lower end of the drill string 11 coupled at the end thereof to the drill bit 12 will be explained below with reference to FIG. 8.

Figure 2:
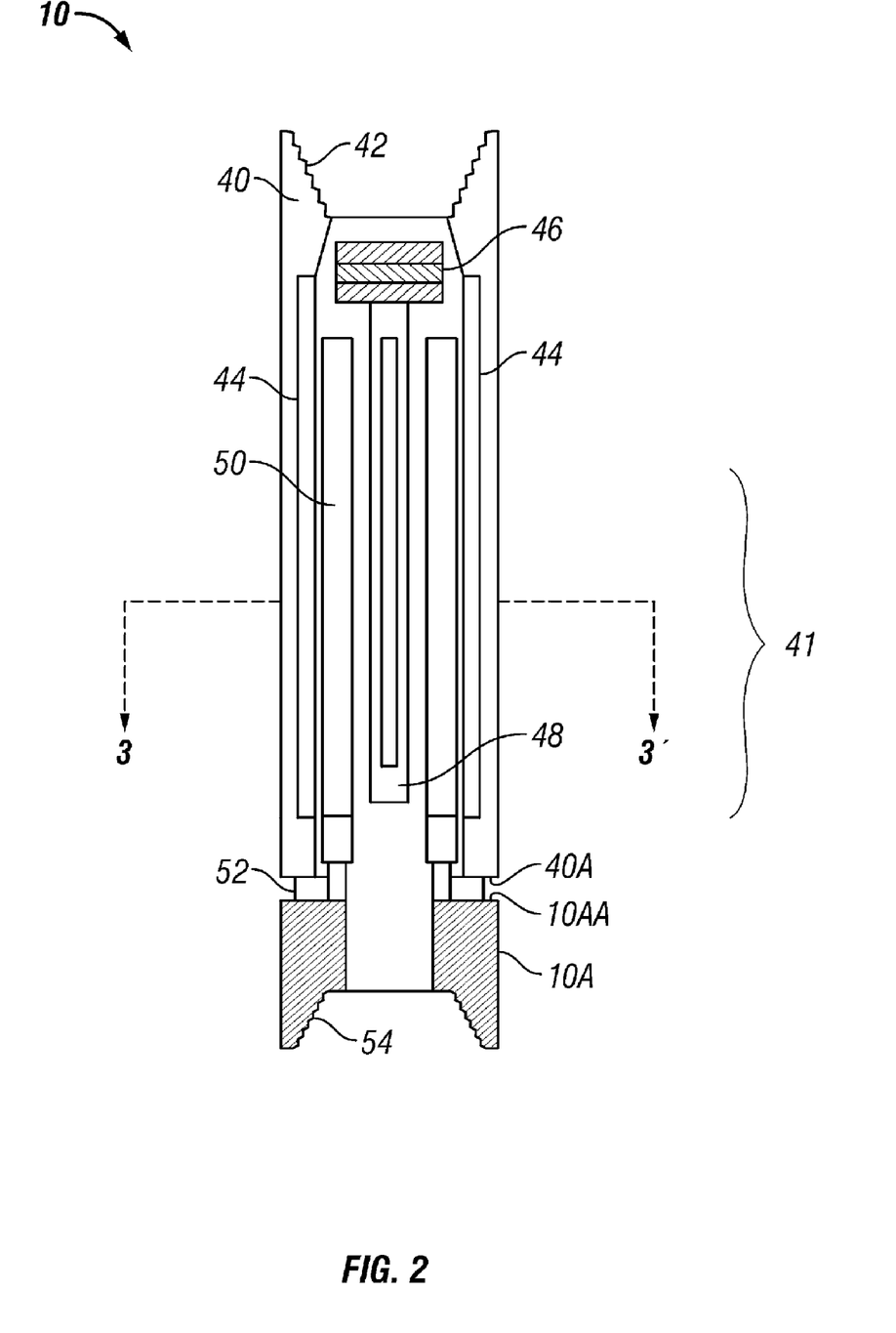
FIG. 2 shows one embodiment of a fluid-driven, geared motor used in the drill string of FIG. 1.

Reference is now made to FIG. 2, which shows one embodiment of a drilling motor 10 according to the invention. The drilling motor 10 is generally contained with in a housing 40 that can be made from a high strength metal alloy. The housing 40 preferably has an external diameter similar to a drill string segment known as a "drill collar", such that the bending and torsional stiffness of the housing 40 will be similar to the adjacent components of the drill string (11 in FIG. 1). The housing 40 includes an upper threaded connection 42 adapted to threadedly engage a corresponding threaded connection on the adjacent part of the drill string (11 in FIG. 1).

As explained above with reference to FIG. 1, the lowermost part of the drilling motor 10 includes a rotatably mounted, threaded coupling (called the "bit box") 10A for threaded engagement by internal threads 54 with a corresponding threaded coupling (12A in FIG. 1) on the drill bit (12 in FIG. 1). An axial thrust bearing 52 is disposed between an upper shoulder 10AA on the bit box 10A and a lower shoulder 40A on the housing 40 such that axial force from the weight of the drill string (11 in FIG. 1) can be transferred through the housing 40 to the bit box 10A while maintaining the ability of the bit box 10A to freely rotate with respect to the housing 40. The axial thrust bearing 52 is preferably a polycrystalline diamond compact ("PDC") bearing such that maintaining separate lubrication and sealing arrangements for the bearing 52 is not necessary. PDC thrust bearings used in drilling motors are known in the art.

Inside the interior of the upper portion of the housing 40 is located a turbine 46, which may include one or more rotor and stator stages, according to design techniques well known in the art, for converting the flow of drilling mud (24 in FIG. 1) into rotational energy. The turbine 46 is rotationally coupled to an input shaft 48 of a magnetic gear member 41. The magnetic gear member 41 in this embodiment reduces the input shaft speed and increases the torque applied to the input shaft, such that an output shaft 50 rotates at a selected fraction of the input shaft speed and provides a corresponding, inversely related output torque. Other applications for a wellbore motor may require that the input shaft speed is multiplied, rather than reduced. Accordingly, the ratio of input speed to output speed of the gear member 41 is not a limit on the scope of this invention.

Preferably, the turbine 46 is rotationally coupled to the input shaft 48 using splines or the like such that thrust load on the turbine 46 caused by movement of the drilling mud (24 in FIG. 1) is not transferred to the input shaft 48. Thrust load on the turbine 46, caused by flow of mud against the turbine 46, may be transferred from the turbine 46 to the housing 40 using an axial thrust bearing (not shown in FIG. 2) similar to the thrust bearing 52 above the bit box 10A. While the present embodiment shows a turbine as the device used to convert wellbore fluid flow into rotational energy, it should be clearly understood that other devices known in the art, including vane type hydraulic motors, gear type hydraulic motors and other types of positive displacement motor can be used in other embodiments to convert fluid flow into rotational energy to operate the wellbore rotary tool through a magnetic gear member.

The magnetic gear member 41 also includes a magnet section 44, that in the present embodiment is rotationally fixed to the housing 40 and is disposed externally to both the input shaft 48 and to a gear member output shaft 50. The output shaft 50 is disposed radially generally between the input shaft 48 and the magnet section 44, and is rotationally coupled to the bit box 12A. Just as for the turbine coupling to the input shaft, the output shaft 50 is preferably rotationally coupled to the bit box 12A such that substantially no axial force on the bit box 12A is transferred to or from the output shaft 50. Such coupling can be accomplished using splines or the like. Splines permit at least some degree of relative axial motion between the spline-coupled components, and thus can prevent transfer of axial loading between the coupled components. Although not shown in FIG. 2, the input shaft 48 is preferably rotatably supported within the output shaft 50 by a radial bearing, such as a journal bearing or sealed ball bearing. Correspondingly, the output shaft is preferably rotatably supported in the housing 40 by radial bearings, such as journal bearings.

Figure 3:
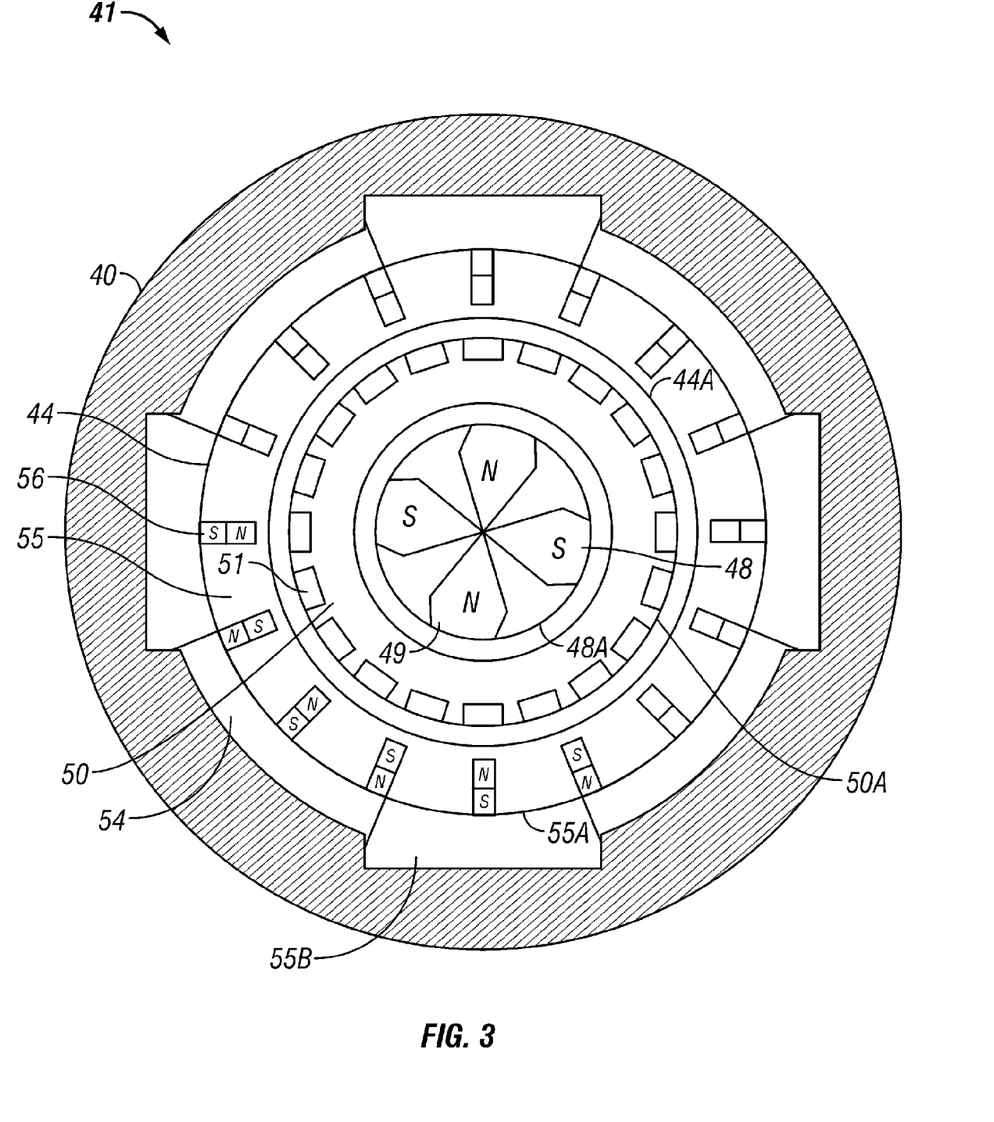
FIG. 3 shows a cross section of the reduction gear section of the geared motor of FIG. 2.

FIG. 3 is a cross section of the drilling motor 10 along line 3-3' in FIG. 2. The cross section is located longitudinally within the magnetic gear member 41 to show the relationship of and the operation of the components of the magnetic gear member 41. The input shaft 48 may be made from high strength alloy, such as explained above with reference to the housing 40. The input shaft 48 includes a plurality of circumferentially spaced apart, permanent magnets 49 oriented such that their poles are aligned radially with alternating polarity as shown in FIG. 3. The magnets 49 are preferably made from a high flux density, high coercivity, relatively heat insensitive material such as samarium-cobalt. The magnets 49 extend generally longitudinally along the input shaft 48. The longitudinal dimensions of the magnets 49 (and corresponding components in the magnet section and output shaft) are selected such that the motor is capable of providing a selected amount of output torque to the output shaft 50. The embodiment in FIG. 3 includes two magnets 49 on the input shaft 48. However, the number of magnets used on the input shaft 48 in other embodiments will be related to the desired gear ratio for the magnetic gear member 41. The magnets 49 may be enclosed on their exterior by a thin walled erosion barrier 48A made from titanium or similar material that is non-magnetic and is resistant to erosion from flow of fluid past the input shaft 48. In other embodiments, the magnets 49 may be made from a single piece of magnetic material that is polarized to have alternating, radially oriented magnetic poles similar to the arrangement of magnets shown in FIG. 3. "A plurality of magnets" as used herein with respect to the magnet section 44 or the input shaft 48 is intended to include such arrangement of multipolar single element magnet material.

The output shaft 50, as explained above is located radially between the input shaft 48 and the magnet section 44. The output shaft 50 can be made from a high strength, non-magnetic alloy such as monel or an alloy sold under the trademark INCONEL, which is a registered trademark of Huntington Alloys Corporation, 3200 Riverside Drive, Huntington, W. Va. Alternatively, the output shaft 50 can be made from composite material such as fiber reinforced plastic. The output shaft 50 can include on its exterior surface, in suitably shaped channels or receptacles, pole pieces 51 disposed circumferentially around the output shaft 50. The pole pieces 51 extend longitudinally for substantially the same length as the input shaft magnets 49. The pole pieces 51 may be surrounded on their exterior by an erosion barrier 50, similar to that as explained above for the input shaft magnets 49. The pole pieces 51 are preferably made from a ferromagnetic material such as soft iron.

Disposed externally to the output shaft is the magnet section 44. The magnet section 44 includes a plurality of circumferentially spaced apart magnets 56. The magnets 56 extend longitudinally substantially the same length as the input shaft magnets 49 and the pole pieces 51. The magnets 56 are oriented such that their dipole moment is substantially transverse to the longitudinal axis of the gear member 41, and radially inward. The magnets 56 are arranged such that adjacent magnets have inverse magnetic polarity with respect to each other. In the present embodiment, the magnets 56 may be permanent magnets such as samarium-cobalt or neodymium-iron-boron. In other embodiments, and as will be explained below with reference to FIG. 4, one or more of the magnets 56 may be electromagnets, such that the gear ratio of the gear member 41 may be changed electrically while the motor (10 in FIG. 1) is in the wellbore (15 in FIG. 1). The magnets 56 are preferably disposed in a non-magnetic alloy retainer 55, such as may be made from monel or INCONEL and are preferably enclosed on their radial outer ends by a flux enclosure 55A such as may be made from ferrite or similar magnetically permeable material. The magnet retainer 55 may include keys 55B or similar locking feature arranged to cooperate with the inner surface of the housing 40 to prevent rotation of the magnet retainer 55, and to provide mud flow channels 54 for drilling mud to pass through after it moves past the turbine (46 in FIG. 2). The magnet section 44 may include an erosion barrier 44A substantially as explained above for the input shaft 48 and output shaft 50.

In the present embodiment, the number of input shaft magnets 49, the number of pole pieces 51 and the number of magnets 56 in the magnet section 44 may be selected to provide any reasonable speed ratio between the input shaft and the output shaft. While other embodiments may provide a different radial arrangement of input shaft, fixed magnet member and output shaft, the present arrangement can provide the advantage of simple mounting and bearing support for the rotating components of the motor 10, while providing relatively large flow area for the drilling mud.

Figure 3A:
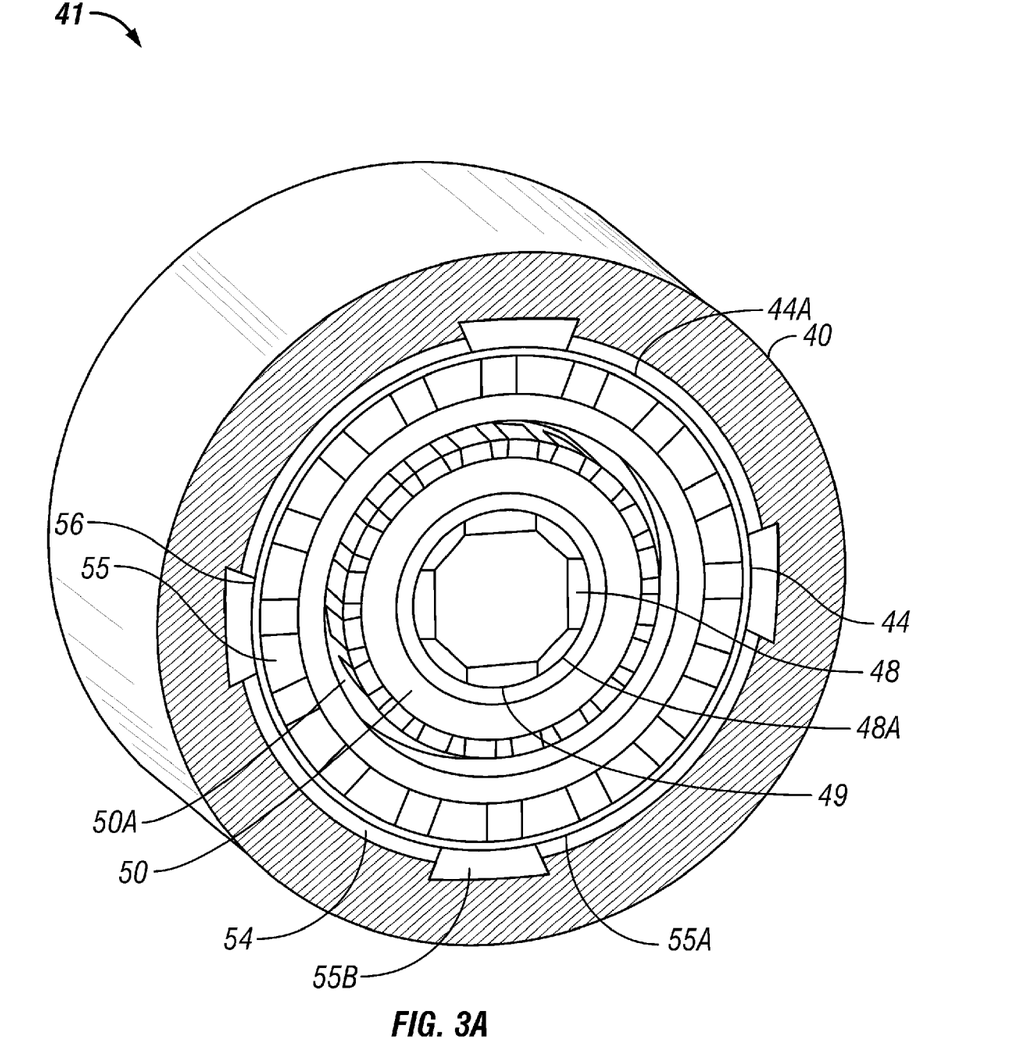
FIG. 3A shows a perspective view of the embodiment shown in FIG. 3.

A perspective view of the present embodiment of the magnetic gear member is shown in FIG. 3A.

Figure 4:
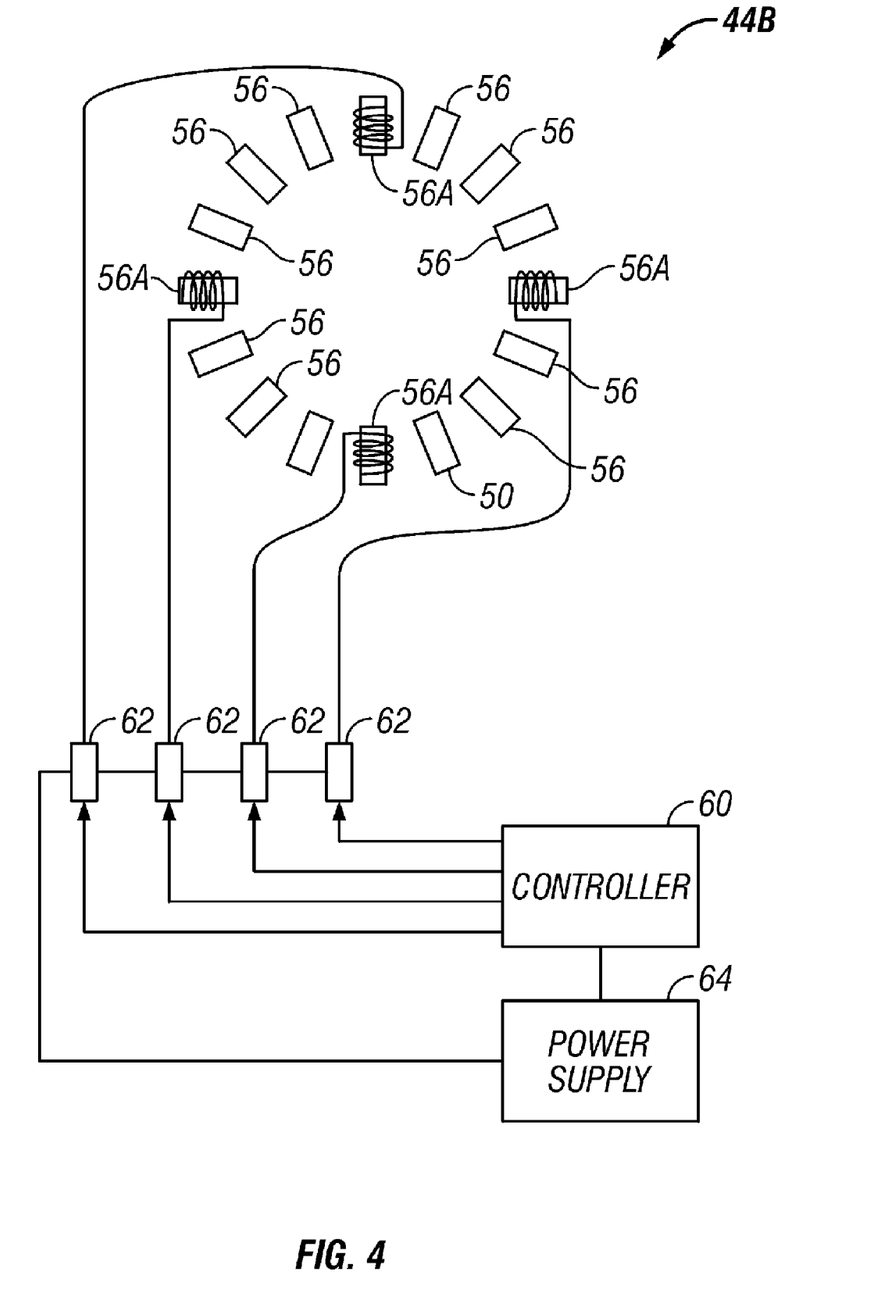
FIG. 4 shows an alternative embodiment of a magnet section using electromagnets.

Another embodiment of a magnet section for a magnetic gear member is shown in FIG. 4. The magnet section 44B in FIG. 4 includes a plurality of magnets 56 arranged circumferentially as explained with reference to FIG. 3. In the embodiment of FIG. 4, however, at least one of the magnets is an electromagnet 56A, such as can be made from a soft iron core and having a wire coil wound therearound. The one or more electromagnets 56A may be selectively operated by a controller 60, which may be any microprocessor based controller, coupled to a switch 62 for each electromagnet. A power supply 64 provides electrical power to operate the controller and electromagnets 56A. The controller 60, in various embodiments, may be operated from any one of a number of control signal sources, including, without limitation, pressure signals transmitted through the drilling mud (24 in FIG. 1) by modulating its pressure and/or flow rate, electromagnetic or acoustic telemetry, and the like, or in response to torque and/or speed sensors placed proximate to the drilling motor (10 in FIG. 1). By selecting the number of electromagnets 56A that are turned on, the effective number of magnets in the magnet section 44B can be changed during operation of the magnetic gear member, thus changing the gear ratio.

Figure 5:
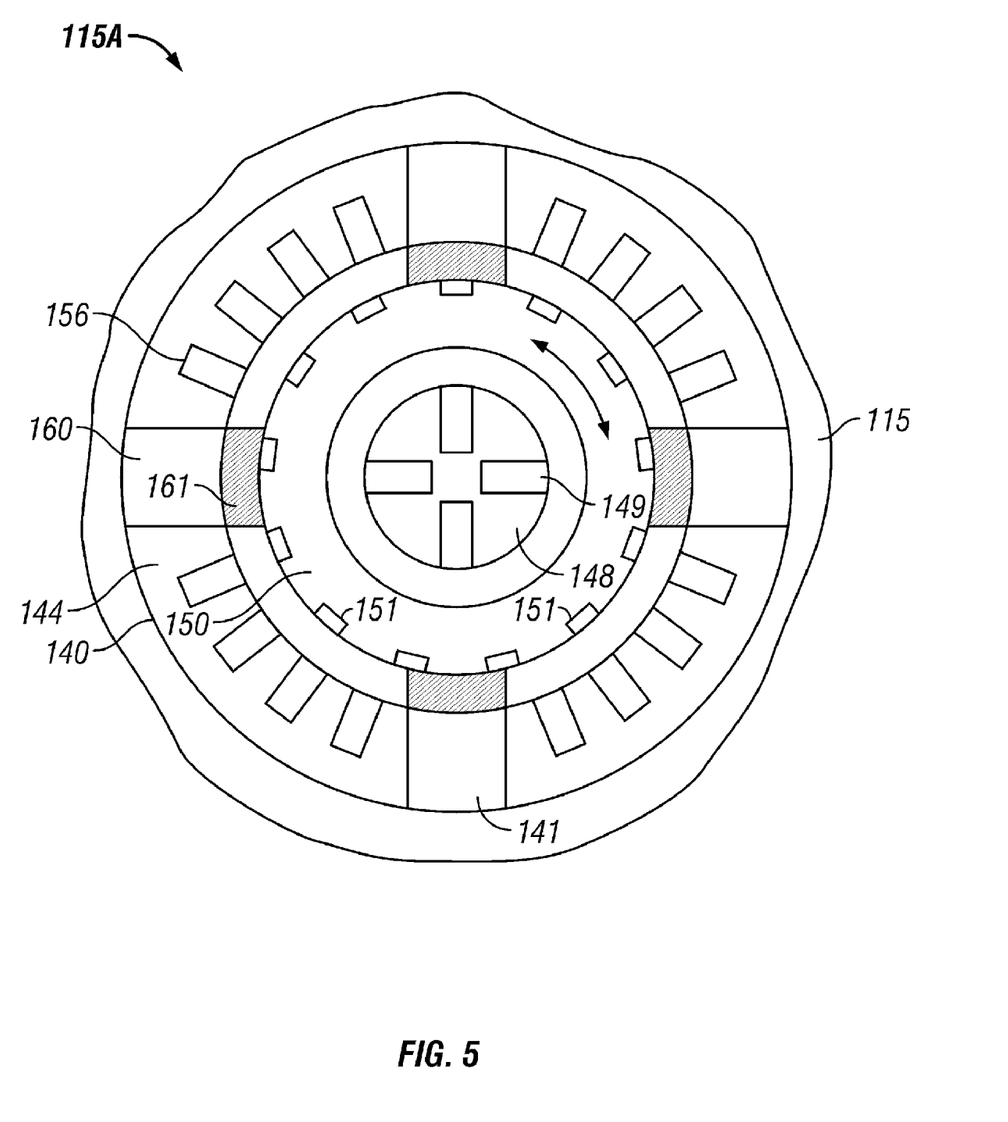
FIG. 5 shows a cross section of one implementation of a wellbore motor according to the invention used with a wellbore completion valve.

Another implementation of a wellbore magnetically geared motor that can be used with a different rotary wellbore tool, in this case a wellbore completion valve, is shown in cross-section in FIG. 5. A casing 140 is disposed in a wellbore 115 drilled through a fluid-producing Earth formation 115A. In the present implementation, the purpose of a completion valve is to controllably enable and disable fluid flow from the Earth formation 115A into the casing 140 to be moved to the Earth's surface. The casing 140 in this embodiment may include one or more fluid flow ports 141 that enable fluid flow through the casing 140. The casing 140 in this embodiment may be cemented or otherwise affixed in the wellbore 115. In the present embodiment, a magnet section 144 of a magnetic gear unit is affixed to the interior of the casing 140. The magnet section 144 may include a plurality of permanent and/or electromagnets, shown generally at 156 and arranged substantially as explained with reference to FIGS. 3 and 4.

A valve spool 150 is located with in the magnet section 144 and can rotate therein, and may include one or more port plugs 161, arranged such that when the plugs 161 are rotationally positioned over corresponding ports 141 in the casing 140, the plugs 161 stop the flow of fluid into the casing 140. The valve spool 150 may be rotated, thus moving the plugs 161 to expose the ports 141 such that fluid flow into the interior of the casing 140 is enabled. The valve spool 150 in the present embodiment may be made in a manner similar to the output shaft of the gear member explained above with reference to FIG. 3, and may include a selected number of pole pieces 151 arranged circumferentially around the valve spool. The pole pieces 151 may be made from soft iron or similar ferromagnetic material, also as explained with reference to FIG. 3. In this embodiment, the output of the magnetic gear member is the same physical element as the valve spool 150, however other implementations may have the valve spool located at a different longitudinal position along the wellbore and thus form a different physical element than the gear member output shaft.

An input shaft 148 is disposed within the radial interior of the output shaft, and includes one or more magnets 149 thereon. The input shaft 148 may be rotationally coupled to a turbine, such as shown in FIG. 2, or similar device to convert movement of fluid within the casing 140 into rotational energy to drive the input shaft 148.

It will be appreciated that the combination of magnet section 144, valve spool 150 and input shaft 148 are similar in operating principle to the gear member shown in and explained with reference to FIG. 3. In the present embodiment, however, rather than driving a drill bit, the valve spool 150, which is functionally equivalent to the output shaft 50 in FIG. 3, drives the port plugs 161 to cover and uncover the ports 141 in the casing 140. Thus, the embodiment shown in FIG. 5 may be used to selectively open and close fluid flow from the formation 115A. In other implementations, the magnets 156 in the magnet section 144 may be electromagnets, such that the gear member may be selectively activated and deactivated, substantially as explained with reference to FIG. 4. By providing selective activation and deactivation of the gear member, the movement of the valve spool 150 may be controlled even in the presence of continuous fluid movement within the casing 140. In some embodiments, the polarity of the magnets 156 may be reversible, when electromagnets are used, such that the rotational direction of the valve spool may be reversed as well. Alternatively, the valve spool may be rotated in the same direction, the rotation being stopped when the ports 141 are covered or uncovered as the valve operator selects. The embodiment shown in FIG. 5 has the valve spool, ports, output shaft, magnet section substantially axially collocated, however other embodiments may have the valve components (valve spool, port plugs and casing ports) axially spaced apart from the magnetic gear member.

The implementations explained above with reference to FIGS. 2 and 5 relate generally to wellbore tools that use flow of fluid in the wellbore to drive a turbine, or similar arrangement that converts fluid flow in the wellbore into rotational motion to operate a device in the wellbore. In other embodiments, a different source of rotational motion may be placed within the wellbore. Such source of rotational motion may be an electric or hydraulic motor having power connections to the Earth's surface such as electrical wiring or hydraulic fluid lines. Such source of rotational motion may also be a string of wellbore tubulars, such as production tubing, drill pipe and the like, or may be solid rods such as used to operate sucker rod pumps. Such devices may be rotated by equipment disposed at the Earth's surface. In the instance of drill pipe, for example, the pipe may be turned from the Earth's surface by a drilling rig as explained above with reference to FIG. 1. Examples of such implementations will now be explained with reference to FIGS. 6, 7 and 8. The description below in FIGS. 6, 7 and 8 are all impliedly disposed in a wellbore drilled through the Earth, as explained above with reference to FIG. 1.

Figure 6:
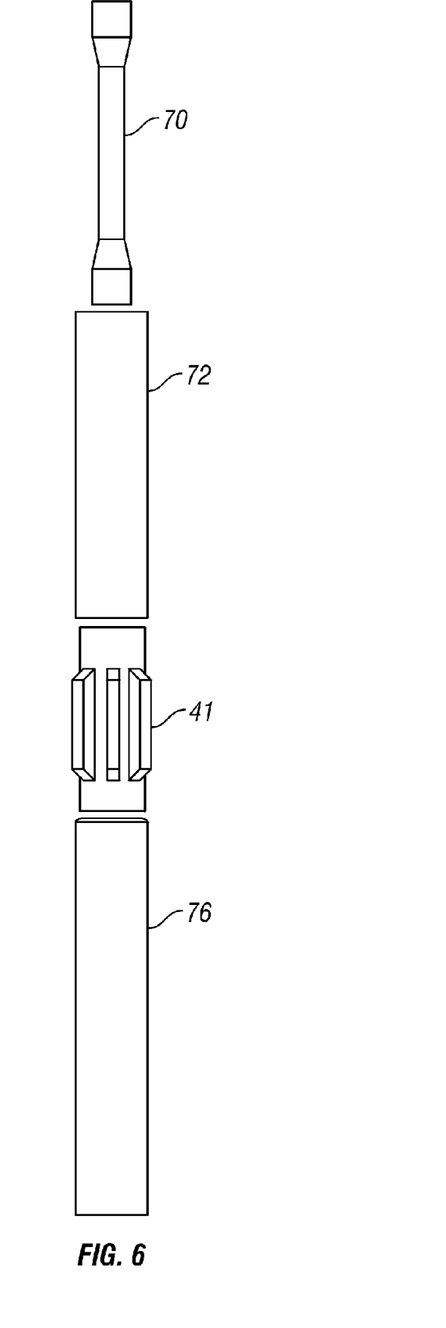
FIG. 6 shows an electric submersible wellbore pump using a magnetic gear member according to the invention.

FIG. 6 shows a magnetic gear member 41, which can be substantially as explained above with reference to FIGS. 3 and 3A, used in conjunction with an electric motor 76 and a pump 72 disposed in a wellbore coupled to the lower end of a production tubing 70. The pump 72, as explained in the Background section herein is used to lift fluids from the wellbore when the fluid pressure in a subsurface reservoir is not sufficient to lift the fluids out of the wellbore unassisted. The tubing 70 carries fluids discharged by the pump 72 to the Earth's surface. The motor 76 and pump 72 may be of any type known in the art and generally referred to in combination as an "electric submersible pump" (ESP). ESPs include electrical wiring (not shown in FIG. 6) to supply electric power from a current source at the Earth's surface to the electric motor 76. The electric motor 76 rotates at a selected design speed. ESPs known in the art prior to the present invention generally had the motor output connected directly to the pump 72, and thus the design speed of the electric motor was compatible with the operating speed of the pump. As a practical matter, the rotational speed of the pump in prior art ESPs is limited by the requirement that the motor 76 is sealed from fluid in the wellbore. By including a magnetic gear member 41 between the motor 76 and the pump 72, it is possible to use a pump that operates at relatively high speed, while using a motor, and accompanying shaft seals, that operate at relatively low speed, thus substantially increasing shaft seal life. As explained above with reference to FIGS. 3 and 3A, the magnetic gear member 41 of the present invention does not require sealing against intrusion of wellbore fluid, thus eliminating the need to seal against a rotating shaft at high rotational speeds. Alternatively, a high-speed, low-torque motor may be used with a reduction type magnetic gear member, to be coupled to a low speed positive displacement pump. In such embodiments, it may be desirable to enclosed the magnetic gear member in the same sealed housing as the electric motor, and provide a shaft seal to the lower speed output shaft of the magnetic gear member.

Figure 7:
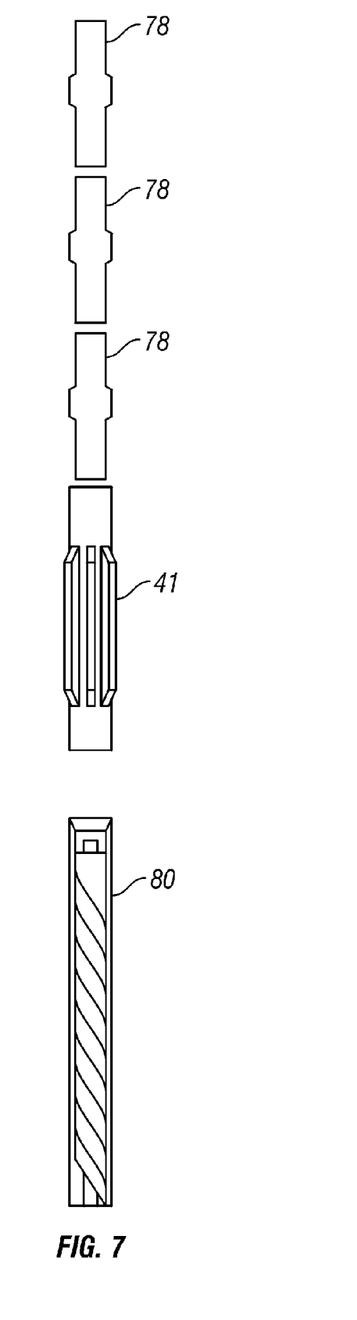
FIG. 7 shows a rod driven wellbore pump using a magnetic gear member according to the invention.

FIG. 7 shows another type of fluid pump 80 in a wellbore that operates by rotational motion supplied through rods 78 extending to the Earth's surface, and coupled to a motor (not shown) thereon disposed. The rods may be threadedly coupled end to end in a string similarly to those used to operate "sucker rod" or "beam" type axial displacement wellbore pumps known in the art. The location and type of such motor (not shown) is not a limit on the scope of the invention. The rods 78 could also be turned by equipment associated with a drilling rig (see FIG. 1) where a drilling rig or completion rig is used at the wellbore. The rods 78 are coupled at a lower end thereof through a magnetic gear member 41, such as explained above with reference to FIGS. 3 and 3A, to a pump 80 disposed in the wellbore. The pump 80 may be a high speed pump, such as a centrifugal pump or progressive cavity positive displacement pump. The magnetic gear member 41 in the present embodiment may take relatively low speed rotation of the rods 78 and convert it to high speed rotation to operate the pump 80. By enabling relatively low rotation speed of the rods 78, it may be possible to extend the life of the rods 78 and reduce wear on the wellbore wall (or casing if the wellbore so includes), while operating a high speed pump. As in other embodiments, the magnetic gear member does not require enclosure in a housing or sealing of rotating shafts to exclude wellbore fluid therefrom.

Figure 8:
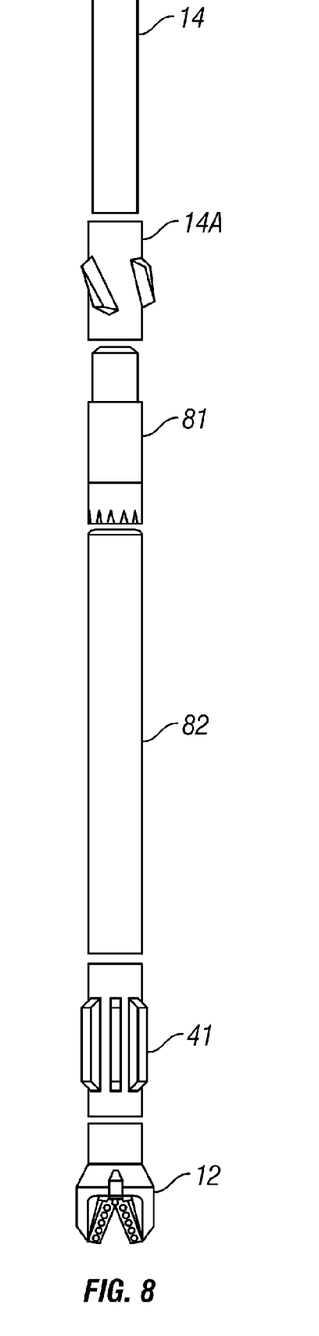
FIG. 8 shows a magnetic gear member according to the invention used between a rotary steerable directional drilling system and a drill bit.

Another implementation for the magnetic gear member is shown in FIG. 8. FIG. 8 shows the lower end of a drill string, as explained generally with reference to FIG. 1. The lower end of the drill string includes collars 14, and in some embodiments one or more gauge stabilizers 14A used for directional drilling control. In the present embodiment, the drill string includes a measurement-while-drilling (MWD) sensor unit 81 of any type known in the art. The MWD sensor unit 81 makes measurements related to the trajectory of the wellbore to enable controlled-direction drilling of the wellbore. A rotary steerable directional drilling assembly (RSS) 82 is disposed below the MWD sensor unit 81 in the drill string. The RSS 82 is a device that selectively biases the drill string in a selected direction such that the wellbore trajectory may follow a predetermined path. One such RSS device is sold under the trademark WELLDIRECTOR, which is a registered trademark of Noble Downhole Technology Ltd. 13135 S. Dairy Ashford Rd., Sugar Land, Tex. Another such RSS device is sold under the trademark POWERDRIVE, which is a registered trademark of Schlumberger Technology Corporation, 200 Gillingham Lane, Sugar Land, Tex. In the embodiment shown in FIG. 8, the input of the magnetic gear member 41, which in the present embodiment is used to increase rotational speed from input to output, is coupled to the RSS 82. The output of the gear member 41 is coupled to a drill bit 12. One particular application for using the magnetic gear member 41 as shown in FIG. 8 is to provide high rotational speed at the gear member 41 output, such that drill bits requiring high speed may be used, while enabling the drill string to rotate at more moderate speeds. Maintaining more moderate rotational speed through the MWD sensor unit 81 and the RSS 82 may increase the service life and reliability thereof.

Embodiments of a geared wellbore motor according to the various aspects of the invention can provide large gear ratio in a diametrically compact housing, can provide ability to resist torsional shock loading without breaking internal components, and can provide reduction (or speed multiplying) gearing without the need to seal a compartment within the motor from wellbore fluids to provide lubrication for mechanical gearing.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A geared wellbore motor and rotary tool system, comprising:
    a source of rotational motion disposed in a wellbore;
    a magnetic gear member rotationally coupled at an input thereof to the source, the magnetic gear member including magnets rotationally coupled to at least one of the input and an output of the gear member, the magnets arranged to magnetically transmit rotation from the input to the output such that at least one of (a) the output rotation speed is greater than the input rotation speed and the output torque is correspondingly less than the input torque and (b) the output rotation speed is less than the input rotation speed and the output torque is correspondingly greater than the input torque; and
    a rotary wellbore tool rotationally coupled to the output of the magnetic gear member tool.

2. The system of claim 1 wherein the source comprises an electric motor.

3. The system of claim 2 wherein the rotary wellbore tool comprises a pump.

4. The system of claim 1 wherein the source comprises rods extending to the Earth's surface from within the wellbore.

5. The system of claim 4 wherein the rotary wellbore tool comprises a pump.

6. The system of claim 1 wherein the source comprises a drill string disposed in the wellbore and extending to a drilling rig at the Earth's surface.

7. The system of claim 6 wherein the rotary wellbore tool comprises a drill bit.

8. The system of claim 6 wherein the magnetic gear member is disposed between the drill string and a drill bit.

9. The system of claim 8 further comprising a rotary steerable directional drilling device rotationally coupled in the drill string between the lower end thereof and the input to the magnetic gear member, and wherein the drill bit is rotationally coupled to the output of the magnetic gear member.

10. The system of claim 1 wherein the magnetic gear member comprises an input shaft rotationally coupled to the source, an output shaft disposed externally to the input shaft, and a magnet section disposed externally to the output shaft, the input shaft, the output shaft and the magnet section disposed inside a housing.

11. The system of claim 10 wherein the magnet section comprises a plurality of magnets circumferentially spaced about an interior of a magnet retainer, the magnet retainer having an external shape for cooperatively engaging an interior surface of the housing so as to prevent rotation therebetween.

12. The system of claim 11 wherein a number of the magnets is selected to provide a selected rotational speed ratio between the input shaft and the output shaft.

13. The system of claim 11 wherein the magnets comprise permanent magnets.

14. The system of claim 11 further comprising a flux closure disposed about a radial exterior of the plurality of magnets.

15. The system of claim 14 wherein the magnets are enclosed on a radial interior by an erosion baffler.

16. The system of claim 10 wherein the output shaft comprises a plurality of ferromagnetic pole pieces circumferentially disposed about an exterior of a drive shaft member, the drive shaft member made from a non-magnetic material.

17. The system of claim 16 wherein a number of the pole pieces is selected to provide a selected ratio of speed between the input shaft and the output shaft.

18. The system of claim 17 wherein the pole pieces are enclosed by an erosion baffler.

19. The system of claim 10 wherein the input shaft comprises a plurality of magnets circumferentially disposed about the input shaft.

20. The system of claim 19 wherein a number of the magnets on the input shaft is selected to provide a selected rotational speed ratio between the input shaft and the output shaft.

21. The system of claim 19 wherein the magnets on the input shaft are enclosed by an erosion baffler.

22. The system of claim 10 wherein an exterior shape of the magnet section includes annular spaces between the exterior of the magnet section and an interior surface of the housing such that wellbore fluid is movable therethrough.

23. The system of claim 10 wherein the output shaft is rotationally coupled to a threaded coupling adapted to threadedly couple to a drilling tool, the threaded coupling rotationally coupled to the output shaft so as to isolate axial load transfer between the output shaft and the threaded coupling, the threaded coupling having an axial thrust bearing associated therewith to transfer axial loading on the threaded coupling to the housing.

24. The system of claim 10 wherein the source is rotationally coupled to the input shaft such that axial force on the source is isolated from the input shaft.

25. The system of claim 11 wherein at least one of the magnets comprises an electromagnet.

26. The system of claim 25 further comprising a controller operatively coupled to the at least one electromagnet, the controller operative to activate and deactivate the at least one electromagnet in response to a control signal.

27. A magnetically geared wellbore motor and driving device system, comprising:
a drill string extended into a wellbore and coupled to a drilling rig at the Earth's surface;
an input shaft rotationally coupled to the drill string in the wellbore, the input shaft having at least one magnet thereon;
an output shaft disposed rotatably about an exterior surface of the input shaft, the output shaft having thereon a plurality of circumferentially spaced apart pole pieces formed from ferromagnetic material;
a magnet section having a plurality of magnets disposed circumferentially about an exterior of the output shaft, the magnet section having a magnet retainer with an external shape adapted to cooperate with an interior of a housing in which the magnet section is disposed such that rotation between the magnet section and the housing is substantially prevented; and
a driving device rotationally coupled to the output shaft and configured to drive a drill bit.

28. The system of claim 27 wherein at least one of the magnets comprises an electromagnet.

29. The system of claim 28 further comprising a controller operatively coupled to the at least one electromagnet, the controller operative to activate and deactivate the at least one electromagnet in response to a control signal.

30. The system of claim 27 wherein the driving device is rotationally coupled to substantially isolate axial force on the drilling tool from the output shaft, the driving device arranged to transfer axial loading thereon to the housing.

31. The system of claim 27 further comprising a rotary steerable directional drilling device coupled in the drill string between the lower end thereof and the input shaft.

32. A wellbore pump, comprising:
a motor disposed in the wellbore, the motor supplied by power from a source external to the wellbore;
a magnetic gear member rotationally coupled at an input thereof to an output of the motor, the magnetic gear member including magnets rotationally coupled to at least one of the input and an output of the gear member, the magnets arranged to magnetically transmit rotation from the input to the output such that at least one of (a) the output rotation speed is greater than the input rotation speed and the output torque is correspondingly less than the input torque and (b) the output rotation speed is less than the input rotation speed and the output torque is correspondingly greater than the input torque; and
a pump coupled at its input to the output of the magnetic gear member.

33. The pump of claim 32 wherein the motor comprises an electric motor.

34. The pump of claim 32 wherein the magnetic gear member comprises an input shaft rotationally coupled to the motor, an output shaft disposed externally to the input shaft, and a magnet section disposed externally to an output shaft rotationally coupled to the pump, the input shaft, the output shaft and the magnet section disposed inside a housing.

35. The pump of claim 34 wherein the magnet section comprises a plurality of magnets circumferentially spaced about an interior of a magnet retainer, the magnet retainer having an external shape for cooperatively engaging an interior surface of the housing so as to prevent rotation therebetween.

36. The pump of claim 35 wherein a number of the magnets is selected to provide a selected rotational speed ratio between the input shaft and the output shaft.

37. The pump of claim 35 wherein the magnets comprise permanent magnets.

38. The pump of claim 35 further comprising a flux closure disposed about a radial exterior of the plurality of magnets.

39. The pump of claim 35 wherein the magnets are enclosed on a radial interior by an erosion barrier.

40. The pump of claim 34 wherein the output shaft comprises a plurality of ferromagnetic pole pieces circumferentially disposed about an exterior of a drive shaft member, the drive shaft member made from a non-magnetic material.

41. The pump of claim 40 wherein a number of the pole pieces is selected to provide a selected ratio of speed between the input shaft and the output shaft.

42. The pump of claim 40 wherein the pole pieces are enclosed by an erosion barrier.

43. The pump of claim 34 wherein the input shaft comprises a plurality of magnets circumferentially disposed about the input shaft.

44. The pump of claim 43 wherein a number of the magnets on the input shaft is selected to provide a selected rotational speed ratio between the input shaft and the output shaft.

45. The pump of claim 43 wherein the magnets on the input shaft are enclosed by an erosion barrier.

46. The pump of claim 34 wherein an exterior shape of the magnet section includes annular spaces between the exterior of the magnet section and an interior surface of the housing such that wellbore fluid is movable therethrough.

47. The motor of claim 34 wherein the motor is rotationally coupled to the input shaft such that axial force on the motor is isolated from the input shaft.

48. The pump of claim 35 wherein at least one of the magnets comprises an electromagnet.

49. The pump of claim 48 further comprising a controller operatively coupled to the at least one electromagnet, the controller operative to activate and deactivate the at least one electromagnet in response to a control signal.

* * * * *